United States Patent
Yoshida et al.

(10) Patent No.: US 8,159,529 B2
(45) Date of Patent: Apr. 17, 2012

(54) IMAGE OUTPUTTING APPARATUS AND PROGRAM

(75) Inventors: Hideaki Yoshida, Hachioji (JP); Ken Mashitani, Neyagawa (JP); Toshio Nomura, Funabashi (JP); Tadashi Uchiumi, Osaka (JP); Hidehiko Sekizawa, Tokyo (JP)

(73) Assignees: Olympus Imaging Corp., Tokyo (JP); Sanyo Electric Co., Ltd., Osaka (JP); Sharp Kabushiki Kaisha, Osaka (JP)

( * ) Notice: Subject to any disclaimer, the term of this patent is extended or adjusted under 35 U.S.C. 154(b) by 1127 days.

(21) Appl. No.: 12/009,501

(22) Filed: Jan. 17, 2008

(65) Prior Publication Data

US 2008/0309755 A1 Dec. 18, 2008

Related U.S. Application Data

(63) Continuation of application No. PCT/JP2006/314276, filed on Jul. 19, 2006.

(30) Foreign Application Priority Data

Jul. 19, 2005 (JP) .................................. 2005-208707

(51) Int. Cl.
 *G06T 15/00* (2011.01)

(52) U.S. Cl. ............................ 348/51; 348/739; 345/419
(58) Field of Classification Search .................... 348/51, 348/739, 52; 345/418–419
See application file for complete search history.

(56) References Cited

U.S. PATENT DOCUMENTS

| | | | | |
|---|---|---|---|---|
| 5,424,801 A | * | 6/1995 | Lo et al. | 355/22 |
| 5,691,805 A | * | 11/1997 | Lo et al. | 355/72 |
| 7,265,902 B2 | * | 9/2007 | Lee et al. | 359/463 |
| 2004/0025175 A1 | * | 2/2004 | Tamekuni et al. | 725/9 |
| 2005/0041162 A1 | * | 2/2005 | Lee et al. | 348/739 |
| 2005/0248561 A1 | * | 11/2005 | Ito et al. | 345/419 |

FOREIGN PATENT DOCUMENTS

EP 1 406 456 4/2004

(Continued)

OTHER PUBLICATIONS

Notice of Reasons for Rejection for Japanese Patent Application No. 2005-208707, mailed Aug. 17, 2010 (2 pgs.) with translation (2 pgs.).
PCT/ISA/210, "International Search Report" for PCT/JP2006/314276, mailed Sep. 5, 2006 (2 pgs.).

(Continued)

*Primary Examiner* — Moustafa M Meky
(74) *Attorney, Agent, or Firm* — John C. Pokotylo; Straub & Pokotylo (57) ABSTRACT

An operation unit switches the operating mode between a 3D display output mode in which the images of the 3D image file are displayed as a stereoscopic images and a 2D display output mode in which one of the images of the 3D image file is displayed as an ordinary planar image. The 3D image file is composed of stereoscopic image data which represents a plurality of monocular images constituting a multi-ocular stereoscopic image and information which is added to the stereoscopic image data and which indicates that the data is stereoscopic data. In the 2D display output mode, a control unit makes an output unit display an image of the 3D image file read from a medium by a media reader and also display a mark on the same screen, indicating that the image displayed in the 2D display output mode is based on the 3D image file.

6 Claims, 5 Drawing Sheets

FOREIGN PATENT DOCUMENTS

| | | |
|---|---|---|
| EP | 1501317 | 1/2005 |
| JP | 5-122733 | 5/1993 |
| JP | 7-234460 | 9/1995 |
| JP | 11-088912 | 3/1999 |
| JP | 2003-050438 | 2/2003 |
| JP | 2004-357156 | 12/2004 |
| JP | 2005-110121 | 4/2005 |
| WO | WO 03/092304 | 6/2003 |

OTHER PUBLICATIONS

PCT/IB/373, "International Preliminary Report on Patentability" for PCT/JP2006/314276 (1 pg.).

English translation of PCT/ISA/237, "Written Opinion of the International Searching Authority" for PCT/JP2006/314276 (3 pgs.).

Supplementary European Search Report for European Patent Application No. 06768302.9-1241, mailed Jul. 7, 2011 (8 pgs.).

* cited by examiner

FIG. 1D 3D file — 14A1

IMAGE OUTPUTTING APPARATUS AND PROGRAM

CROSS REFERENCE TO RELATED APPLICATIONS

This is a Continuation Application of PCT Application No. PCT/JP2006/314276, filed Jul. 19, 2006, which was published under PCT Article 21(2) in Japanese.

This application is based upon and claims the benefit of priority from prior Japanese Patent Application No. 2005-208707, filed Jul. 19, 2005, the entire contents of which are incorporated herein by reference.

BACKGROUND OF THE INVENTION

1. Field of the Invention

The present invention relates to an image outputting apparatus that displays or prints images of a 3D image file. The invention also relates to a program that enables computers to function as such an image outputting apparatus.

2. Description of the Related Art

A direct-view display using 3D liquid crystal (see, for example, Jpn. Pat. Appln. No. 5-122733), a face-mount display (FMD) capable of displaying 3D images, or a head-mount display (HMD) capable of displaying 3D images can display images of a 3D image file that is stereoscopic image data representing a plurality of monocular images that constitute a multi-ocular stereoscopic image. If such a display outputs two different monocular images for the left and right eyes, respectively, a stereoscopic image will be observed (a 3D display output). On the other hand, if the display outputs two identical monocular images for the left and right eyes, respectively, a planar image will be observed (a 2D display output). Particularly, the direct-view display limits positions where people can observe images. It is therefore extremely necessary for the direct-view display to output 2D images if a plurality of persons need to see the images at the same time. Note that "3D" and "2D" used in the present specification mean "three-dimensional" and "two-dimensional," respectively. Hereinafter, too, "3D" and "2D" will be used.

A printer may print 3D images from a 3D image file. In this case, the printer must print the images in a prescribed format so that the images may look three-dimensional to people who observe them by using a viewer or a lenticular sheet (see, for example, Jpn. Pat. Appln. No. 7-234460). However, any image printed in such a format as disclosed in Jpn. Pat. Appln. No. 7-234460 may look unnatural or cannot be well observed, because it consists of left monocular image stripes and right monocular image stripes that are alternately arranged. Hence, 2D print output, i.e., printing only a left monocular image or only a right monocular image, is absolutely necessary in order to provide an ordinary photograph.

With regard to terminology, "3D" and "stereoscopic" are used in the same meaning in the present specification, unless otherwise defined. Both terms are used to mean the stereoscopic technology accomplishing stereoscopy that reproduces visually real three-dimensional information of subject. In some cases the terms may be used in different senses in context or by custom. Nonetheless, they are not different in essential meaning.

BRIEF SUMMARY OF THE INVENTION

According to a first aspect of the invention, there is provided an image outputting apparatus for displaying images of a 3D image file composed of stereoscopic image data which represents a plurality of monocular images constituting a multi-ocular stereoscopic image and information which is added to the stereoscopic image data and which indicates that the data is stereoscopic data, the apparatus comprising: a display output mode switching unit which switches a display output mode of the apparatus, between a 3D display output mode in which the images of the 3D image file are displayed as a stereoscopic image and a 2D display output mode in which one of the images of the 3D image file is displayed as an ordinary planar image; and a control unit which indicates on a screen that the 3D image file is a 3D image file, when one of the images of the 3D image file is displayed in the 2D display output mode.

According to a second aspect of the invention, there is provided an image, outputting apparatus for printing images of a 3D image file composed of stereoscopic image data which represents a plurality of monocular images constituting a multi-ocular stereoscopic image and information which is added to the stereoscopic image data and which indicates that the data is stereoscopic data, the apparatus comprising: a print output mode switching unit which switches a print output mode of the apparatus, between a 3D print output mode in which the images of the 3D image file are printed in a format for viewing a stereoscopic image and a 2D print output mode in which one of the images of the 3D image file is printed as an ordinary planar image.

According to a third aspect of the invention, there is provided an image outputting apparatus for printing images of a 3D image file composed of stereoscopic image data which represents a plurality of monocular images constituting a multi-ocular stereoscopic image and information which is added to the stereoscopic image data and which indicates that the data is stereoscopic data, the apparatus comprising: a print output mode switching unit switches a print output mode of the apparatus, between a 3D print output mode in which the images of the 3D image file are printed in a format for viewing a stereoscopic image and a 2D print output mode in which one of the images of the 3D image file is printed as an ordinary planar image; and a printing method input unit which receives an instruction as to whether the images of the 3D image file should be printed in the 2D print output mode or the 3D print output mode, when the images of the 3D image file are printed.

According to a fourth aspect of the invention, there is provided an image outputting apparatus for printing images of a 3D image file composed of stereoscopic image data which represents a plurality of monocular images constituting a multi-ocular stereoscopic image and information which is added to the stereoscopic image data and which indicates that the data is stereoscopic data, and for printing images of an ordinary image file, the apparatus comprising: a print output mode switching unit switches a print output mode of the apparatus, between a 3D print output mode in which the images of the 3D image file are printed in a format for viewing a stereoscopic image and a 2D print output mode in which one of the images of the 3D image file is printed as an ordinary planar image; and a printing method input unit which receives an instruction as to whether the images of the 3D image file should be printed in the 2D print output mode or the 3D print output mode, when the images of the 3D image file are printed; a printing execution mode switching unit which switches a printing mode, between a single-image printing mode in which one image file is printed and a continuous printing mode in which a plurality of image files are printed; and a control unit which prints, in the single-image printing mode, images of the 3D image file in the print output mode selected by the printing method input unit, and for printing, in the continuous printing mode, images of the 3D-image file in the 2D print output mode.

According to a fifth aspect of the invention, there is provided a computer readable memory containing program for enabling a computer to display images of a 3D image file composed of stereoscopic image data which represents a plurality of monocular images constituting a multi-ocular stereoscopic image and information which is added to the stereoscopic image data and which indicates that the data is stereoscopic data, the program describing the steps of: switching a display output mode between a 3D display output mode in which the images of the 3D image file are displayed as a stereoscopic image and a 2D display output mode in which one of the images of the 3D image file is displayed as an ordinary planar image; and indicating on a screen that the 3D image file is a 3D image file, when one of the images of the 3D image file is displayed in the 2D display output mode.

Advantages of the invention will be set forth in the description which follows, and in part will be obvious from the description, or may be learned by practice of the invention. Advantages of the invention may be realized and obtained by means of the instrumentalities and combinations particularly pointed out hereinafter.

BRIEF DESCRIPTION OF THE SEVERAL VIEWS OF THE DRAWING

The accompanying drawings, which are incorporated in and constitute a part of the specification, illustrate embodiments of the invention, and together with the general description given above and the detailed description of the embodiments given below, serve to explain the principles of the invention.

DETAILED DESCRIPTION OF THE INVENTION

Best modes for carrying out the present invention will be described, with reference to the accompanying drawings.

First Embodiment

Figure 1A:
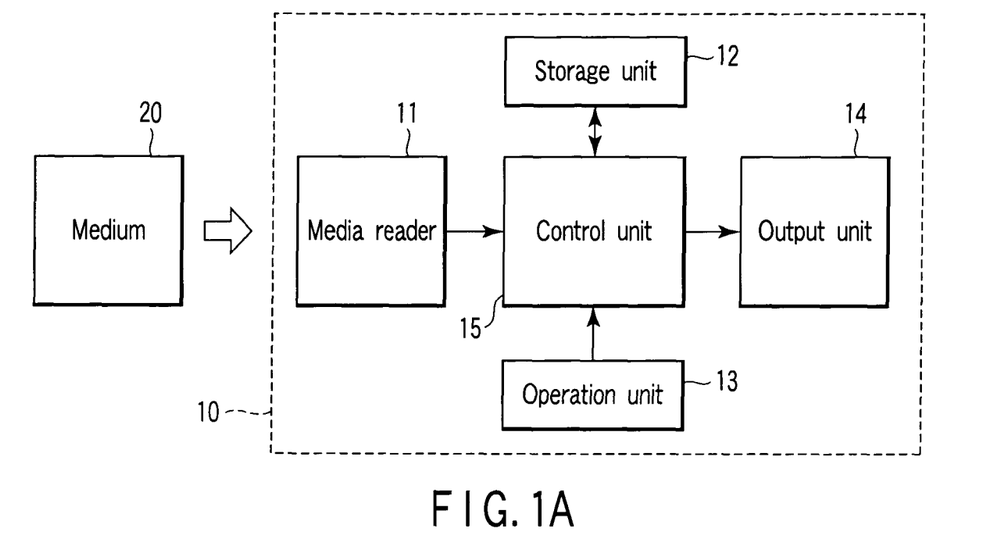
FIG. 1A is a block diagram of an image outputting apparatus according to a first embodiment of the present invention.

FIG. 1A is a diagram showing the configuration of an image outputting apparatus 10 according to a first embodiment of this invention. The image outputting apparatus 10 comprises a media reader 11, a storage unit 12, an operation unit 13, an output unit 14, and a control unit 15. The media reader 11 is designed to read image files from a medium 20. The storage unit 12 stores programs and various data items. The operation unit 13 inputs instructions when operated by a user. The output unit 14 is, for example, a 3D liquid crystal display that displays images based on image files. The control unit 15 is constituted by a CPU that controls the other components of the image outputting apparatus 10.

The image outputting apparatus 10 may be provided in the form of a standalone display apparatus that comprises the above-described configuration and a housing containing the configuration. For example, the storage unit 12 and the control unit 15 are implemented as a personal computer, and the media reader 11, the operation unit 13 (keyboard or mouse in this case) and the output unit 14 (display that can display 3D images, in this case) are connected to the personal computer (PC). Instead, the apparatus 10 may be a general-purpose PC, such as a notebook PC, which an integral apparatus composed of a PC and some devices peripheral to the PC. Further, the apparatus 10 may have a network connection unit in place of the media reader 11, thereby to utilize the image files stored in an external server.

The image files described above are classified into two types. One type is a 2D image file that is composed of ordinary 2D image data and header information. The other type is a 3D image file is composed of stereoscopic image data and header information containing a data item identifying the stereoscopic image data. The stereoscopic image data represents a plurality of monocular images that constitute a multi-ocular stereoscopic image. Stereoscopic image data is used in the present invention. Nonetheless, this image data is not stereoscopic graphic data consisting of pixel coordinate data items, each being a three-dimensional data item. Rather, it is indeed ordinary two-dimensional image data, when regarded as coordinate information. Hence, the 2D image file and the 3D image file are labeled with the same extension. The user may not determine whether an image file is a 2D image file or a 3D image file, from the name of the image file. An image file 21, for example, is a JPEG file that complies with both the Exif standard, i.e., digital camera file format standard, and the DCF standard, i.e., file system standard.

Figure 1B:
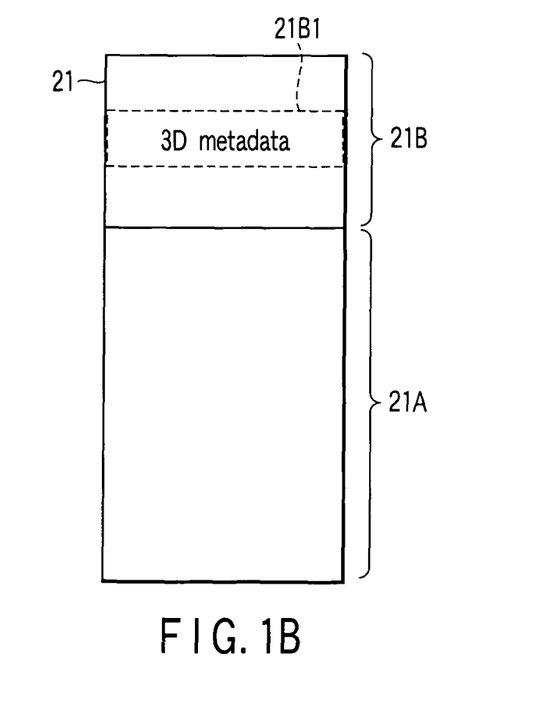
FIG. 1B is a diagram representing the concept of an image file.

FIG. 1B is a diagram that represents the concept of the image file 21. The image file 21 is composed of an image data part 21A and a header part 21B. In the image data part 21A, image data is actually recorded. In the header part 21B, header information is recorded as Exif tag information.

That is, compressed image data obtained by compressing one planar image data item is recorded in the image data part 21A if the file is a 2D image file. If the image file is a 3D image file, compressed image data obtained by compressing stereoscopic image data that represents two monocular images, i.e., left and right images, is recorded in the image part 21A.

If the file is a 2D image file, a parameter related to the recording and reproduction of the compressed image data recorded in the image part 21A is recorded in the header part 21B. If the file is a 3D image file, not only the parameter related to the recording and reproduction of the compressed image data recorded in the image part 21A, but also 3D metadata 21B1 is recorded, as Exif tag information, in the header part 21B. The 3D metadata 21B1 contains information showing that the compressed data recorded in the image data part 21A is stereoscopic image data, and information showing the viewpoint positions of the respective monocular images.

The 3D metadata 21B1 can be recorded not only as Exif tag information, but also in any desirable form. It may be recorded as text metadata described by using XML, e.g., XMP® that is proposed by Adobe Inc.

How the image outputting apparatus 10 according to this embodiment operates will be explained.

In the present embodiment, the image outputting apparatus 10 can operate in two modes. One mode is 3D display output mode, in which the apparatus 10 displays a stereoscopic image based on a 3D image file. The other mode is 2D display output mode, in which the apparatus 10 displays an ordinary image, i.e., a planar image, based on a 2D image file. The storage unit 12 stores display output mode information that shows which display output mode is selected at present. For example, when the power switch of the image outputting apparatus 10 is turned on, the control unit 15 executes the main program stored in the storage unit 12, setting the 2D display output mode, as display output mode information, in the storage unit 12. The image outputting apparatus 10 is thereby made to operate in the 2D display output mode.

Figure 2A:
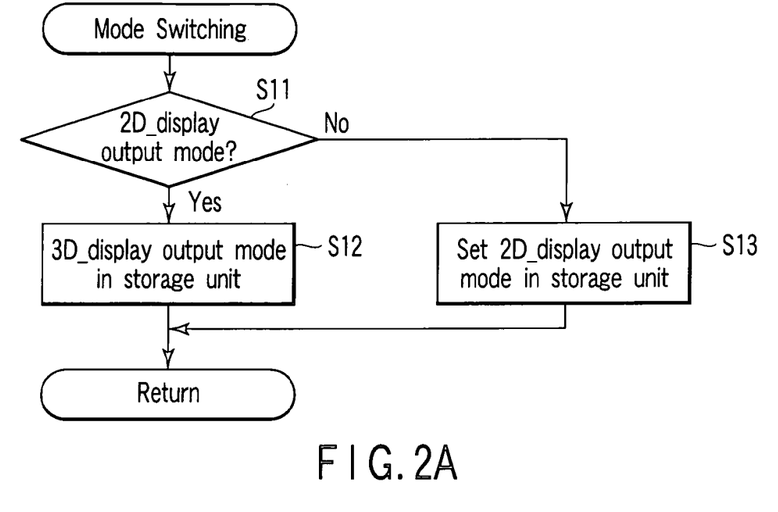
FIG. 2A is a flowchart explaining a mode switching process.

When the user operates the operation unit 13, switching the operating mode, the control unit 15 performs such a process as shown in the flowchart of FIG. 2A, in accordance with the mode switching program that is stored in the storage unit 12.

That is, the control unit 15 refers to the display output mode information stored in the storage unit 12 and determines whether the present display output mode is the 2D display output mode or not (Step S11). If the present display output mode is the 2D display output mode, the control unit 15 sets the 3D display output mode, as display output mode information, in the storage unit 12. The image outputting apparatus 10 can then operate in the 3D display output mode (Step S12). If the present display output mode is the 3D display output mode, the control unit 15 sets the 2D display output mode, as display output mode information, in the storage unit 12. The image outputting apparatus 10 can thereby operate in the 2D display output mode (Step S13).

The mode switching program is designed to switch the display output mode, from one to another, in accordance with, for example, the same operating instruction. If each mode can be selected independently of any other modes (by using buttons provided for the respective modes, or by designating each mode in a pull-down menu), it is, of course, sufficient to set in the storage unit 12 the display output mode thus selected, as display output mode information.

The user may operate the operation unit 13, selecting a desired image file from a list (not sown) displayed by the output unit 14. Alternatively, the user may operate the operation unit 13 while an image file is being displayed, instructing that the image file following or preceding this image file should be displayed. How the apparatus 10 operates in either case will be explained, with reference to the flowchart of FIG. 2B.

Figure 2B:
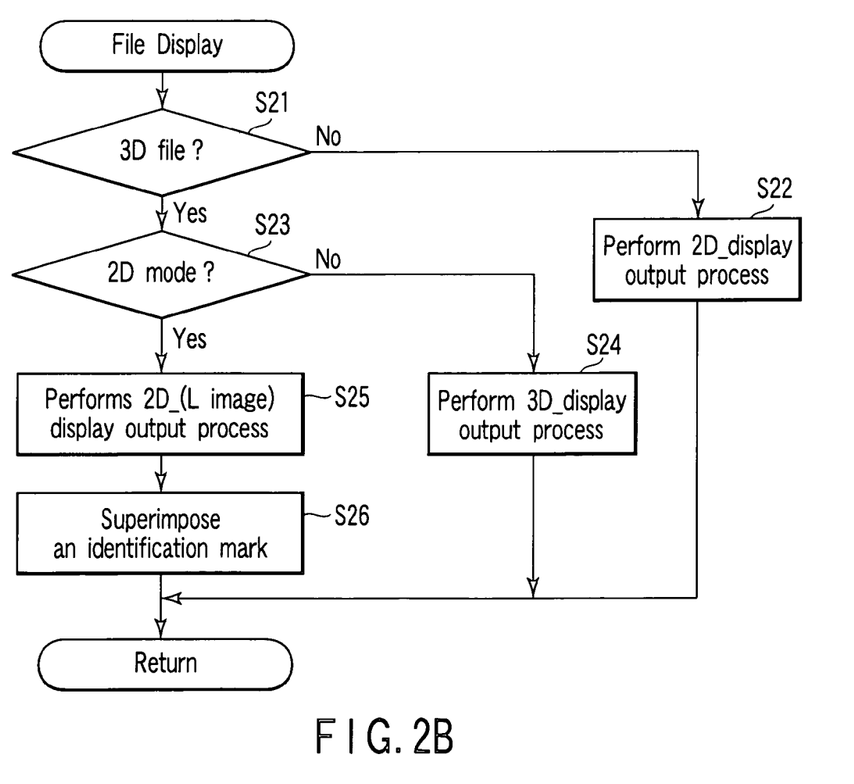
FIG. 2B is a flowchart explaining a process of displaying an image on the basis of a file.

First, the control unit 15 reads the image file 21 designated to be displayed, by the media reader 11, in accordance with the program stored in the storage unit 12. Then, the control unit 15 determines whether the 3D metadata 21B1 exists in the header part 21B of the image file 21, thereby determining whether the image file 21 is a 3D image file or not (Step S21). If the image file 21 is a 2D image file, the control unit 15 performs a 2D display output process (Step S22). That is, the control unit 15 expands the compressed image data recorded in the image data part 21A of the image file 21, thereby acquiring a planar image (2D image). The control unit 15 makes the output unit 14 display the planar image thus acquired.

It should be noted here that what is displayed in this case is an ordinary (2D) image file. Hence, 2D display output, so-called here, is totally identical to the standard conventional image display. Nevertheless, in a display that can perform 3D display, e.g., a direct-view 3D LCD using an active parallax barrier, the display hardware control must be switched from the 3D display control to perform the standard conventional (2D) image display, inevitably because of the configuration of the display. This is why the term "2D display output process" is used herein, meaning the conventional image display.

If the image file 21 read is a 3D image file, the control unit 15 further refers to the display output mode information stored in the storage unit 12 and determines whether the present display output mode is the 2D display output mode or not (Step S23). If the present display output mode is the 3D display output mode, the control unit 15 performs the 3D display output process (Step S24). That is, the control unit 15 expands the compressed image data recorded in the image data part 21A of the image file 21, generates a stereoscopic (3D) image from the 3D metadata 21B1 recorded in the header part 21B and makes the output unit 14 display the 3D image thus generated. If the hardware 3D/2D control must be carried out as described above, the control unit 15 will select the 3D display and then makes the output unit 14 display the 3D image.

On the other hand, if the present display output mode is the 2D display output mode, the control unit 15 performs the 2D display output process (Step S25). That is, the control unit 15 expands the compressed image data recorded in the image data part 21A of the image file 21, generates one of the left and right monocular images, e.g., left (L) monocular image, from the 3D metadata 21B1 recorded in the header part 21B and makes the output unit 14 display the left (L) image as a planar image. If it is necessary to perform the hardware 3D/2D control as described above, the left (L) image, for example, is set to a 2D displayed state and the then output to the output unit 14, which displays a 2D image. That is, a 2D display output is effected, displaying an image of a 3D image file as a planar image. In this case, the identification mark image stored in the storage unit 12 is read and superimposed on the planar image displayed by the output unit 14.

Figure 1C:
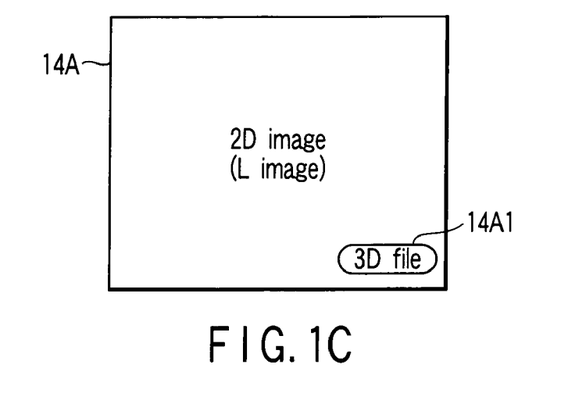
FIG. 1C is a diagram showing a display screen, for explaining an exemplary image displayed.

FIG. 1C is a diagram showing an output screen 14A of the output unit 14, for explaining an exemplary image of a 3D image file, which is displayed on the output screen 14. As FIG. 1C shows, on the L image as a planar image, an identification mark 14A1 is superimposed, indicating that the L image is based on a 3D image file.

Thus, the mark is displayed, indicating that the image displayed is based on a 3D image file in the image outputting apparatus 10, only in the mode is the 3D display output mode. Therefore, the user is not bothered to determine whether any 2D image displayed is based on a 2D image file or a 3D image file.

In the image outputting apparatus 10 according to the present embodiment, a mark is displayed on the same screen as an image is displayed, indicating that the image is based on a 3D image file. The apparatus 10 therefore need not have a display, such as an indicator for displaying such a mark. In addition, such a mark calls the user's attention more effectively.

Figure 1D:
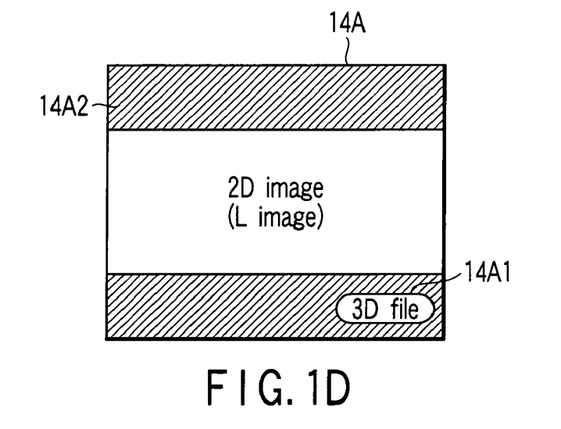
FIG. 1D is a diagram showing a display screen, for explaining another exemplary image displayed.

The position at which the identification mark 14A1 should be superimposed is not limited to the position shown in FIGS. 1C and 1D, i.e., the lower right corner of the output screen 14A. The mark 14A1 can be superimposed at any position in the output screen 14A.

The mark may be superimposed on the image for a constant time (for example, 3 seconds) or may be flickered. The superimpose display may be used concomitantly with the flicker display. The mark is effectively seen, in whichever way it is displayed. Moreover, the mark may be superimposed in accordance with an instruction made by the user or a system. Further, the method shown in FIG. 2B can be used in a similar way to display a list of images, in a reduced size, or to display thumbnail images.

An image recording apparatus is available, which uses a 3D image file contains, for example, two monocular images, which extracts the corresponding parts of these images and which generates a 3D image from the image parts extracted. In some cases, the aspect ratio of an image may differ from the aspect ratio of the output screen 14A of the output unit 14. Therefore, such a padding 14A2 as depicted in FIG. 1D may be displayed in a region that cannot be extracted as a 3D image or a region that has no pixels. Only if the above-mentioned identification mark 14A1 is displayed in this region, it will not overlap any parts of the image displayed on the screen 14A.

The image will, of course, be observed as a whole if the identification mark 14A1 superimposed can be erased as the user operates the operation unit 13.

Figure 1E:
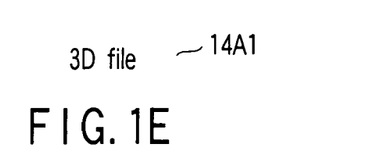
FIG. 1E is a diagram showing an exemplary identification mark.
Figure 1F:
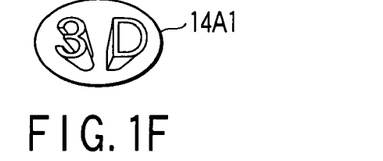
FIG. 1F is a diagram showing another exemplary identification mark.

The identification mark 14A1 is not limited to the type shown in FIGS. 1C and 1D. Rather, it may be such text data as shown in FIG. 1E or such a logo as shown in FIG. 1F, which the user can well recognize.

Second Embodiment

In the first embodiment, the output unit 14 is a display that can display 3D images. In an image outputting apparatus 10 according to a second embodiment, the output unit 14 is a printer that can print images of 3D image files.

Figure 3A:
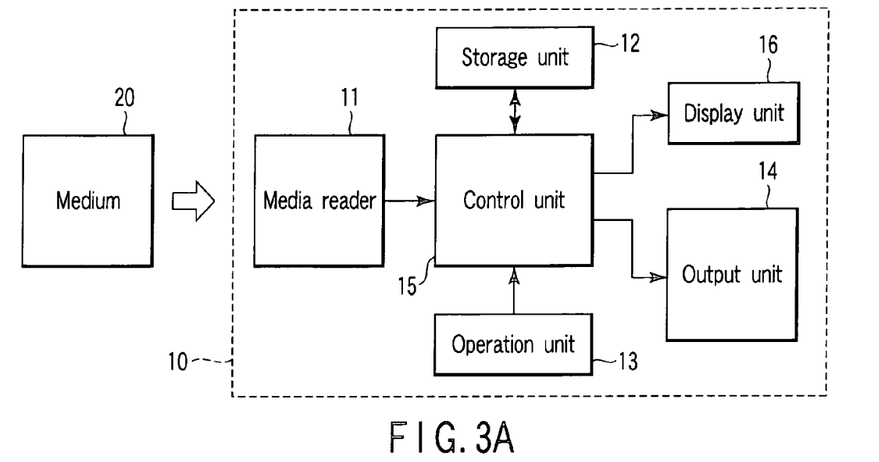
FIG. 3A is a block diagram of an image outputting apparatus according to a second embodiment of the present invention.

FIG. 3A is a diagram showing the configuration of the image outputting apparatus 10 according to the second embodiment of the present invention. This apparatus 10 has a display unit 16, in addition to the components the first embodiment has. The display unit 16 is configured to display inquiry messages to the user and the operating mode of the image outputting apparatus 10. As indicated above, the output unit 14 is a printer. Like the first embodiment, the image outputting apparatus 10 can be provided as a stand-alone printing apparatus that comprises the above-described configuration and a housing containing the configuration. Alternatively, it may comprise a PC. Further, the apparatus 10 may have a network connection unit in place of the media reader 11, thereby to utilize the image file 21 stored in an external server.

In the image outputting apparatus 10 according to the present embodiment, a 2D print output mode in the storage unit 12, as print output mode information, when the power switch of the image outputting apparatus 10 is turned on, and the print output mode can be switched when the user operates the operation unit 13. In this respect, the second embodiment is similar to the first embodiment.

Figure 3B:
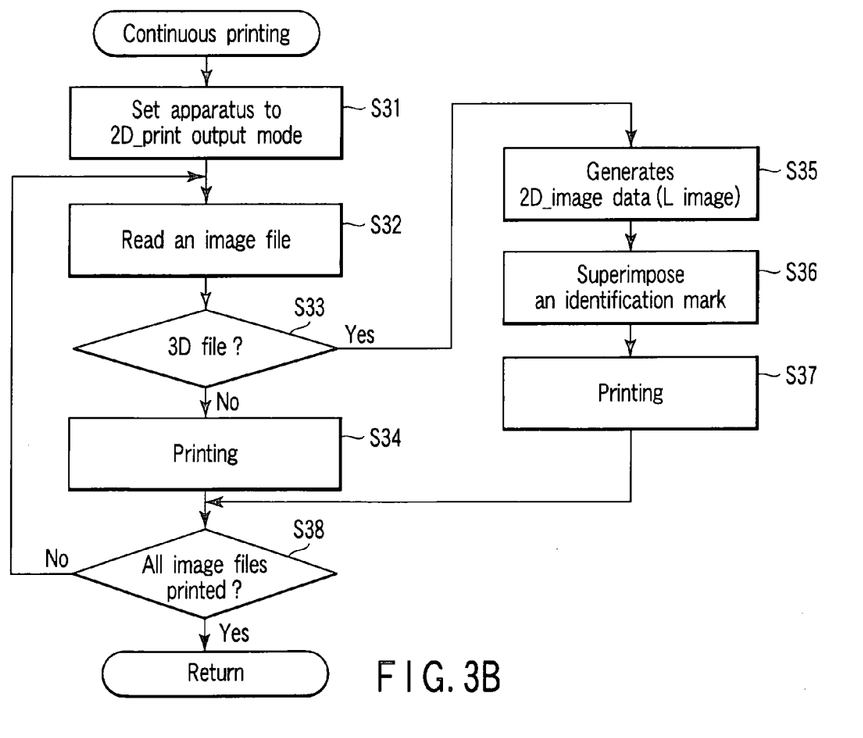
FIG. 3B is a flowchart explaining a process of continuously printing images in the second embodiment.

It will be explained how the apparatus 10 operates if the user operates the operation unit 13, thereby designating the process of continuously printing all image files or a plurality of image files recorded in the medium 20, with reference to the flowchart of FIG. 3B.

First, the control unit 15 set the 2D print output mode, as print output mode, in the storage unit 12, in accordance with the program stored in the storage unit 12. Therefore, the image outputting apparatus 10 starts operating in the 2D print output mode (Step S31).

That is to say, the user cannot stay at the apparatus 10 throughout the continuous printing in most cases. Inevitably, the printing is interrupted time when an image based on a 3D image file is to be printed and remains interrupted until the user comes back to decide whether the image should be printed in the 3D print output mode or the 2D print output mode. In order to prevent such a printing interruption, the ordinary printing mode is automatically set, on the assumption that the ordinary printing that needs no special observation means such as a lenticular sheet. This is because the continuous printing (i.e., printing many photographs at a time, some being 2D images and others being 3D images) is sample printing similar to "simultaneous printing" or "film roll printing."

Thereafter, the control unit 15 makes the media reader 11 read one image file 21 from the medium 20 (Step S32). The control unit 15 then determines whether a 3D metadata exists in the header part 21B of the image file 21, thereby determining whether the image file 21 is a 3D image file or not (Step S33). If the image file 21 is a 2D image file, there are no problems in printing. In this case, the standard printing process hitherto known in the art is performed (Step S34). That is, the control unit 15 expands the compressed image data recorded in the image data part 21A of the image file 21 read, and then causes the output unit 14 to print the planar image (2D image) thus acquired.

If the image file 21 is a 3D image file, the control unit 15 operates to accomplish 2D print output, i.e., printing one of images of the 3D image file in the form of an ordinary planar image. That is, the control unit 15 expands the compressed image data recorded in the image data part 21A of the image file 21 read. The control unit 15 then generates planar image data from one of the two monocular images, e.g., the left (L) monocular image, on the basis of the 3D metadata recorded in the header part 21B (Step S35). Further, the control unit 15 reads the image data representing the identification mark, from the storage unit 12, and superimposes this data on the planar image data it has generated as described above, thus generating print data (Step S36). The identification mark data may be superimposed on the planar image, at any desirable position on the image as in the first embodiment. Alternatively, the identification mark 14A1 may be printed in the margin, that is, outside the image. The control unit 15 makes the output unit 14 print an image based on the print data (Step S37) Such a print output as shown in FIG. 1C is thereby obtained (in this case, the output screen 14A is equivalent to a sheet of printing paper).

After the print output is thus made in Step S34 or Step S37, the control unit 15 determines whether all image files recorded in the medium 20 or the entire image file the user has designated has been printed or not (Step S38). If any image file has not been printed, the operation returns to Step S32, in which the control unit 15 reads the image file and repeats the subsequent steps. Thus, the control unit 15 repeats the steps until all image files are printed.

When the operating mode is switched to the 2D print output in Step S31, the data presenting which print output mode has been selected before may be held. Then, the operating mode may be switched back to the held print output mode when the continuous printing is completed.

Figure 4:
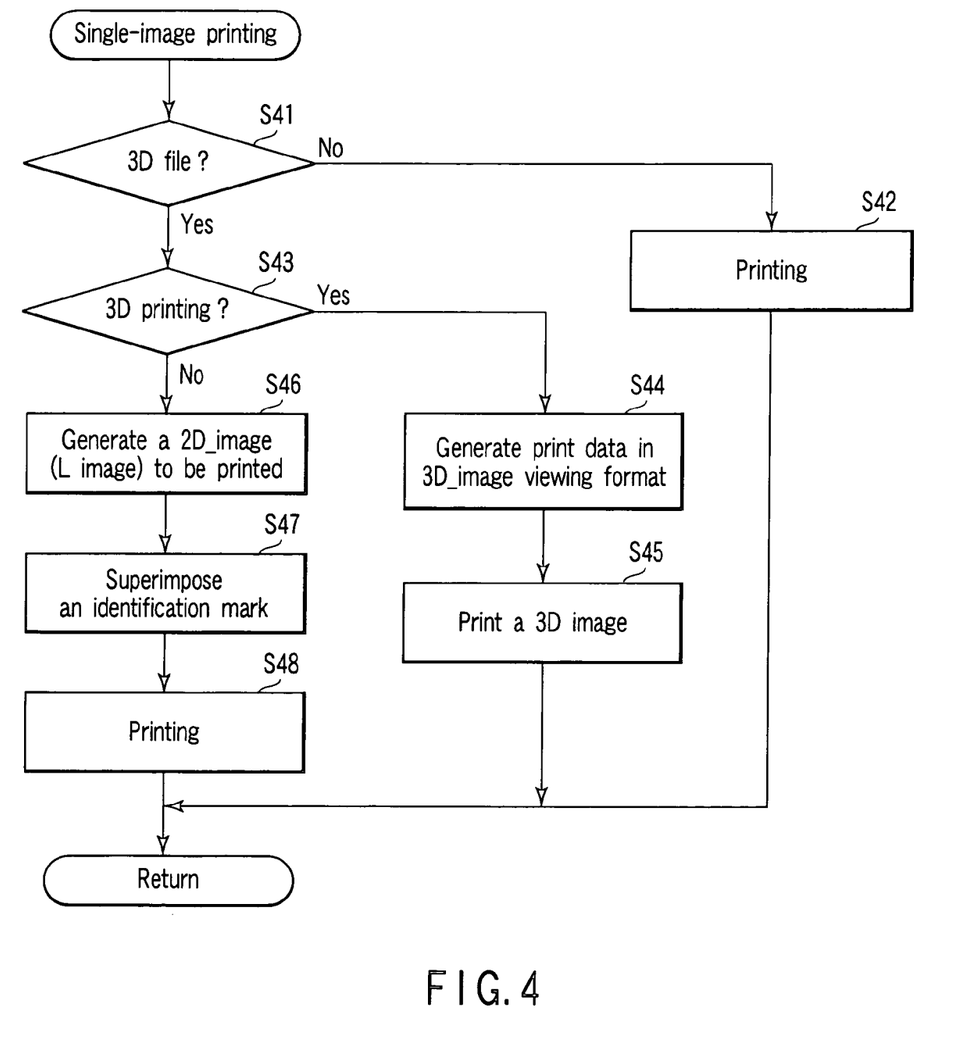
FIG. 4 is a flowchart explaining a process of printing a single image in the second embodiment.

How the control unit 15 operates if the user operates the operation unit 13, designating the print output of one image file selected from the image file list displayed by the display unit 16 (thus, designating single-image printing) will be explained with reference to the flowchart of FIG. 4.

That is, the control unit 15 performs the following process in accordance with the program stored in the storage unit 12. First, the control unit 15 makes the media reader 11 read the image file 21 to be printed, from the medium 20. Then, the control unit 15 determines whether the 3D metadata 21B1 exists in the header part 21B of the image file 21, thereby determining whether the image file 21 is a 3D image file or not (Step S41). If the image file 21 is a 2D image file, the control unit 15 performs the standard printing process hitherto known in the art (Step S42). More precisely, the control unit 15 expands the compressed image data recorded in the image data part 21A of the image file 21 read, and then causes the output unit 14 to print the planar image (2D image) thus acquired.

If the image file 21 may be a 3D image file, the control unit 15 makes the display unit 16 displays an inquiry message, asking the user if the image file may be printed as a 2D image. Then, the control unit 15 determines which type of an image file the user has selected, a 2D image file or a 3D image file (Step S43). If the user has instructed that a 3D image should be printed, the 3D print output process is carried out. That is, the control unit 15 expands the compressed image data recorded in the image data part 21A of the image file 21 read. The control unit 15 then generates print data in such a format for viewing stereoscopic images, as disclosed in Jpn. Pat. Appln. No. 7-234460, from the 3D metadata 21B1 recorded in the header part 21B (Step S44). The control unit 15 then makes the output unit 14 print a 3D image represented by the print data (Step S45).

If the user has instructed that a 2D image should be printed, the control unit 15 expands the compressed image data recorded in the image data part 21A of the image file 21 read. The control unit 15 then generates planar image data from one of the two monocular images, e.g., the left (L) monocular image, on the basis of the 3D metadata 21B1 recorded in the header part 21B (Step S46). Further, the control unit 15 reads the image data representing the identification mark, from the storage unit 12, and superimposes this data on the planar image data it has generated, thus generating print data (Step S47). The control unit 15 makes the output unit 14 print the print data (Step S48). Such a print output as shown in FIG. 1C is thereby obtained (in this case, the output screen 14A is equivalent to a sheet of printing paper).

As has been described, when the image outputting apparatus 10 according to the second embodiment prints a 2D image based on a 3D image file, it prints an identification mark, too, indicating that the image printed is based on the 3D image file. This makes it unnecessary for the user to confirm on which file, a 2D image file or a 3D image file, the 2D image printed is based. This is very useful, particularly in such sample printing as in the continuous printing described above.

In a single printing a single 3D image in such a manner as described above, either a 2D print output process or 3D print output process is performed in accordance with the user's choice. Hence, images are never printed in a format that the user does not want, and paper and ink are not wasted.

It is well expected that the identification mark 14A1 need not be printed if the user selects the 3D print output every time a 3D image should be printed, so frequently as in the case of sample printing. In printing photographs finally to be pasted to an album, for example, the identification mark superimposed on each photograph may be bothersome. In view of this, it would be better not to superimpose the identification mark, depending on the use of the photographs printed.

In the image outputting apparatus 10 according to the present embodiment, in the single printing, a single image is printed as 2D image or 3D image, based on a 3D image file, in accordance with the user's choice. By contrast, in the continuous printing, all images printed are 2D images, because the continuous printing is considered as a sample printing. Hence, even if a 3D image file is printed together with ordinary (2D) image files, 3D images can be efficiently printed in such a form as meets their use, and paper and ink are not wasted.

In the present embodiment, the display unit 16 may be replaced by an audio output unit that produces spoken inquiries.

Further, in this embodiment, the position at which the identification mark 14A1 is to be superimposed is not limited to a particular one, as in the first embodiment. The mark 14A1 may instead be printed in the padding 14A2 (corresponding to a non printed part). In this case, the identification mark 14A1 would not overlap the image, and the image can be seen in its entirety.

The identification mark 14A1 can be of any design so long as the user, who sees it, can well understand that the image file is a 3D image file.

The present invention has been explained with reference to some embodiments. Nevertheless, this invention is not limited to the embodiments described above. Various changes and modifications can, of course, be made within the scope and spirit of the present invention.

This invention can provide an image outputting apparatus and a program that enables a user to know easily that a 2D image displayed or printed is based on a 2D image file or a 3D image file, without doing anything to confirm on which file, the 2D image file or the 3D image file, the 2D image is based.

Further, the present invention can provide an image outputting apparatus and a program that can print images in an appropriate format.

What is claimed is:

1. An image outputting apparatus for displaying images of a 3D image file composed of stereoscopic image data which represents a plurality of monocular images constituting a multi-ocular stereoscopic image and information which is added to the stereoscopic image data and which indicates that the data is stereoscopic data, the apparatus comprising:
a display output mode switching unit which switches a display output mode of the apparatus, between a 3D display output mode in which the images of the 3D image file are displayed as a stereoscopic image and a 2D display output mode in which one of the images of the 3D image file is displayed as an ordinary planar image;
a display output control unit which indicates on a screen that the 3D image file is a 3D image file, when one of the images of the 3D image file is displayed in the 2D display output mode;
a printing execution mode switching unit which switches a printing mode, when receiving printing instruction, between a single-image printing mode in which one image file is printed and a continuous printing mode in which a plurality of image files are printed continuously; and
a print output control unit which prints, in the single-image printing mode, images of the 3D image file in a selected print output mode, and which prints, in the continuous printing mode, images of the 3D image file in the 2D print output mode.

2. An image outputting apparatus for printing images of a 3D image file composed of stereoscopic image data which represents a plurality of monocular images constituting a multi-ocular stereoscopic image and information which is added to the stereoscopic image data and which indicates that the data is stereoscopic data, the apparatus comprising:
a print output mode switching unit which switches a print output mode of the apparatus, between a 3D print output mode in which the images of the 3D image file are printed in a format for viewing a stereoscopic image and a print output mode in which one of the images of the 3D image file is printed as an ordinary planar image;

a printing execution mode switching unit which switches a printing mode, when receiving a printing instruction, between a single-image printing mode in which one image file is printed and a continuous printing mode in which a plurality of image files are printed continuously; and a print output control unit which prints, in the single-image printing mode, images of the 3D image file in accordance with the print output mode selected as a result of waiting for the print output mode switching unit to select the print output mode, and which prints, in the continuous printing mode, images of the 3D image file in the 2D print output mode.

3. The image outputting apparatus according to claim 2, further comprising control unit for indicating by printing that the 3D image file is a 3D image file, when one of the images of the 3D image file is printed in the 2D print output mode.

4. An image outputting apparatus for printing images of a 3D image file composed of stereoscopic image data which represents a plurality of monocular images constituting a multi-ocular stereoscopic image and information which is added to the stereoscopic image data and which indicates that the data is stereoscopic data, and for printing images of an ordinary image file, the apparatus comprising:

a print output mode switching unit switches a print output mode of the apparatus, between a 3D print output mode in which the images of the 3D image file are printed in a format for viewing a stereoscopic image and a 2D print output mode n which one of the images of the 3D image file is printed as an ordinary planar image;

a printing method input unit which receives an instruction as to whether the images of the 3D image file should be printed in the 2D print output mode or the 3D print output mode, when the images of the 3D image file are printed;

a printing execution mode switching unit which switches a printing mode between a single-image printing mode in which one image file is printed and a continuous printing mode in which a plurality of image files are printed; and a control unit which prints, in the single-image printing mode, images of the 3D image file in the print output mode selected by the printing method input unit, and which prints, in the continuous printing mode, images of the 3D image file in the 2D print output mode.

5. The image outputting apparatus according to claim 4, wherein the control unit is configured to indicate by printing that the 3D image file is a 3D image file, when one of the images of the 3D image file is printed in the 2D print output.

6. A computer readable memory containing program for enabling a computer to display images of a 3D image file composed of stereoscopic image data which, represents a plurality of monocular images constituting a multi-ocular stereoscopic image and information which is added to the stereoscopic image data and which indicates that the data is stereoscopic data, the program describing the steps of:

switching a display output mode between a 3D display output mode in which the images of the 3D image file are displayed as a stereoscopic image and a 2D display output mode in which one of the images of the 3D image file is displayed as an ordinary planar image;

indicating on a screen that the 3D image file is a 3D image file, when one of the images of the 3D image file is displayed in the 2D display output mode;

switching a printing mode, when receiving a printing instruction between a single-image printing mode in which one image file is printed and a continuous printing mode in which a plurality of image files are printed continuously; and printing, in the single-image printing mode, images of the 3D image file in a selected print output mode, and which prints, in the continuous printing mode, images of the 3D image file in the 2D print output mode.

* * * * *